United States Patent [19]

Sarkozy et al.

[11] Patent Number: 5,720,027

[45] Date of Patent: Feb. 17, 1998

[54] REDUNDANT DISC COMPUTER HAVING TARGETED DATA BROADCAST

[75] Inventors: Andras Sarkozy, Nashua, N.H.; James Valentino, Stoneham, Mass.

[73] Assignee: Storage Computer Corporation, Nashua, N.H.

[21] Appl. No.: 652,636

[22] Filed: May 21, 1996

[51] Int. Cl.$^6$ .................................................. G06F 11/08
[52] U.S. Cl. ........................ 395/182.04; 364/268.3; 364/242.91; 371/40.1
[58] Field of Search .................. 395/182.04, 182.09, 395/477; 364/268.3, 242.91, 243; 371/40.1, 40.4, 42

[56] References Cited

U.S. PATENT DOCUMENTS

| | | | |
|---|---|---|---|
| 4,092,732 | 5/1978 | Ouchi | 364/900 |
| 5,072,378 | 12/1991 | Manka | 395/182.04 |
| 5,134,619 | 7/1992 | Henson | 371/40.1 |
| 5,257,367 | 10/1993 | Goodlander et al. | 395/600 |
| 5,274,645 | 12/1993 | Idleman | 395/182.04 |
| 5,285,451 | 2/1994 | Henson | 395/182.04 |
| 5,499,337 | 3/1996 | Gordon | 395/182.04 |

Primary Examiner—Robert W. Beausoliel, Jr.
Assistant Examiner—Dieu-Minh Le
Attorney, Agent, or Firm—Davis & Bujold

[57] ABSTRACT

A redundant disk computer system providing targeted data broadcast on the data bus to a plurality of devices on the data bus, such as computer central memory and a plurality of storage media disks (parity and data) under control of a real time operating system. Each of the plural disk storage media is each connected to the data bus with a corresponding enhanced disk adapted including a demand page memory of size sufficient to include a selected block of data and arranged to provide access to a selected portion of that data. The redundant array computer operating system provides the control and selected designation of the disk adapters as targeted receivers to read data "broadcast" over the data bus, providing simultaneous transfer of data over the data bus. Each enhanced disk adapter further includes exclusive-OR logic thereon to provide direct calculation of parity from the newly received data and a subsequently received old data on a single subsequent data bus cycle. Thus, according to the present invention, the number of data bus data transfers is reduced and significant improvements in system performance is provided.

14 Claims, 8 Drawing Sheets

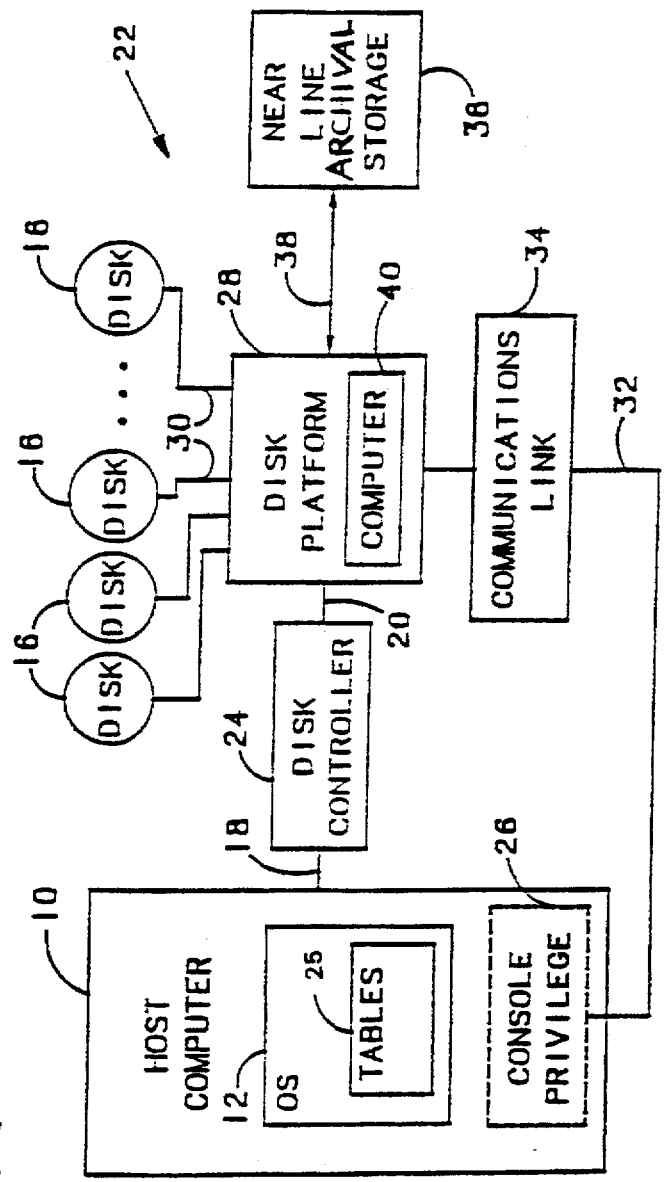

REDUNDANT DISC COMPUTER HAVING TARGETED DATA BROADCAST

FIELD OF THE INVENTION

The present invention relates to computer system, in particular to redundant array independent drive computer systems having multiple host data destinations.

BACKGROUND OF THE INVENTION

The architecture of computer systems having redundant arrays of inexpensive (or independent) disks (RAID) has been defined by Paterson et al. in report UCB/CSD 87/391, December, Computer Science Division (EECS), University of California at Berkeley, herein incorporated by reference. Included in the RAID computer technology are various species, or "levels" which describe various arrangement of data mapping and protection, and operating system consideration.

Typically, the RAID computer systems relate to small computers having a data bus and a control bus, a central memory array, several disk storage media in a redundant array, an area for internal real time operating systems, and small computer synchronous interface (SCSI) bus interface units to interface external hosts to the small computer data bus and to control the host by the operating system via the small computer control bus.

In prior RAID computer systems, when data is written to the redundant storage media, typically inexpensive disk drives, in which typically require a data WRITE to a data drive and parity WRITE to a parity drive (distinct from the data drive). Also, prior to the WRITEs to each drive, the data and parity from each drive must be read so that the parity information can be modified or calculated and correctly rewritten. However, this single transfer of data to disk media requires multiple data bus transfers, as illustrated by the following data transfer. First, data received from a SCSI host is received by a corresponding host adapter board and transferred to the data bus and on to the computer memory array. Second, old data is read from the selected data drive and sent over the data bus by the data drive adapter to the computer array. Third, old parity is read from the parity drive and sent, via the parity drive adapter and the data bus and onto the computer memory array. Next, at the memory array, new parity data is created by logic (XOR logic operating on the new data and old date and parity) which is sent over the data bus to the associated parity drive through the parity drive adapter board. Finally, new data is sent from the computer memory array over the data bus to the data drive through the data drive adapter. Thus in the typical prior systems, the single data transfer from the host to the disk storage media involves five (5) data bus transfers which presents a significant bottleneck to data transfer, thus seriously diminishing performance of such systems.

Prior RAID computer systems fail to appropriately address the bottleneck, consequently resulting in the poor performance of such systems. Systems known as "RAID level 5" attempt to address the problem by rotating the parity information across all the redundant disks. However, the data bus transfer problem is not solved, but rather merely delayed by involving additional disks. Moreover, by storing parity every drive, the solution provided by the RAID 5 system further imposes an access time penalty equal to $(1/N) \times 100$ percent (wherein is the number of disk drives) in unnecessary seek time penalties. For example, if a RAID 5 system has five (5) redundant disk drives with parity information on each, then twenty (20%) percent of all time spent doing seeks for host READs and WRITEs will be moving parity information which is degrading to system performance.

Furthermore, prior system performance is restricted by system requirements that data transfers be linked to specific disk (media) accesses, and even requiring that each disk drive be accessed for every READ and WRITE. Moreover, some prior RAID computer systems also include operating systems which define a single dedicated parity drive, which together with the points of prior system limitation discussed above, impose time and space constraints on the RAID system resulting in significantly inferior performance of such systems.

The present invention relies on three features each of which contributes to additional performance. The current prior art system provides that all data be exclusive-ORed is XORed on the Array Computer board by way of a hardware circuit. Data scheduled for XOR going to or from a triple adapter card must go through the cache card.

With this prior art, under normal circumstances, consider a write to a data drive (which means a write to the data drive and a write to the parity drive, which further implies a previous read from each of those two drives so that the integrity of the parity information can be modified and rewritten), data is received through the host board, goes OVER THE XBUS to the Array Computer board, the old data is read from the selected data drive, through the Triple Adapter and OVER THE XBUS to the Array Computer board; the old parity data is read from the parity drive, through the Triple Adapter and OVER THE XBUS to the parity Triple Adapter board. From the Array Computer board the new data is created via XOR and sent OVER THE XBUS to the parity Triple Adapter board and associated parity drive. From the Array Computer board the new data is sent OVER THE XBUS to the data Triple Adapter board and associated data drive. Thus the XBUS is involved in a total of 5 transfers. When the XBUS is the bottleneck to performance these transfers are time expensive.

With this prior art system performance could be improved by either speeding up the XBUS or doing fewer transfers.

SUMMARY OF THE INVENTION

The present invention provides improvement over the prior art by a) changing hardware (HW) and software (SW) to allow for simultaneous transfers over the XBUS; b) changing the HW and SW to allow hardware parity calculation on the Triple Adapter board; and c) changing the HW on the Triple Adapter board to accommodate more memory per channel (specifically, a scalable amount).

With these changes, in accordance with the present invention, the number of XBUS transfers is reduced from 5 to 2 (one from host board OVER THE XBUS to Array Computer board and Triple Adapter X and Triple Adapter Y and one from selected data drive through Triple Adapter card X OVER THE XBUS to Triple Adapter card Y). Assuming a crowded XBUS as a bottleneck this transaction occurs 150% faster. This is a speed up of traffic over the XBUS without increasing the bus clock speed. Not all transfers are WRITEs (typically 10 to 20%), however, and not all of customer's traffic is going to be XBUS limited.

READs benefit as well. In lieu of going from the triple OVER THE XBUS to the Array Computer board and OVER THE XBUS to the host board, they can go simultaneously to both boards for a 100% effective bus speed increase.

The RAID computer system according to the present invention includes enhanced redundant array media disk)

adapter cards including significant demand page memory (cache) thereon under real time operating system control which provides a targeted reception of data broadcast from SCSI hosts directly and simultaneously to several data bus reading devices, such as the parity disk and data disk controller adapter card, as well as to the central memory array. Moreover, the enhanced redundant array adapter cards include data logic for direct calculation of parity (or other functions) thereon, such as exclusive-OR (XOR) logic. According to the present invention, after an initial data bus transfer from the host, a single additional data bus transfer from the redundant array media controller is the only data bus transfer that is necessary complete the host-to-redundant array data transfer. The redundant array media controller resident logic will directly calculate the new parity from the old data received on the data bus and the new data and old parity previously received and stored in the demand page memory. Thus, the complete data transfer to the redundant array media (e.g. disks) is typically provided by only two data bus transfers, compared to the five data bus transfers of prior art systems. Still further improvements are provided in systems according to the present invention which use multiple parity (e.g. P and Q) disks which together simultaneously read this host data from the data bus.

According to the present invention, as each redundant array controller includes logic associated with the demand page memory, the operating system is free to (re)define and (re)allocate parity and data to any number of the drives, thus selecting an optimal number of drives for a particular system, thereby resulting in more efficient RAID computer system operation. Furthermore, the READs from the media will benefit from the present invention as well. For instance, in lieu of going from the disk media through a disk adapter to the data bus and then to the memory array, and then during a subsequent bus cycle going over the data bus to the host adapter board, the redundant disk data can be read simultaneously by the computer memory array and the host adapter board resulting in an effective bus speed increase of 100 percent. Therefore, according to the present invention, the disks can appear to host(s) as being able to accept related transfers not only in series, but in parallel from targeted data "broadcasts", systems according to the present invention show significant performance gains.

BRIEF DESCRIPTION OF THE DRAWING

These and other features according to the present invention will be better understood by reading the following Detail Description taken together with the drawing, wherein:

FIG. 1 illustrates a prior art improved system in which the present invention could be implemented;

FIG. 2 is a prior art simplified block diagram of a platform-based disk memory system that could implement the present invention;

DETAILED DESCRIPTION OF THE INVENTION

Figure 3:
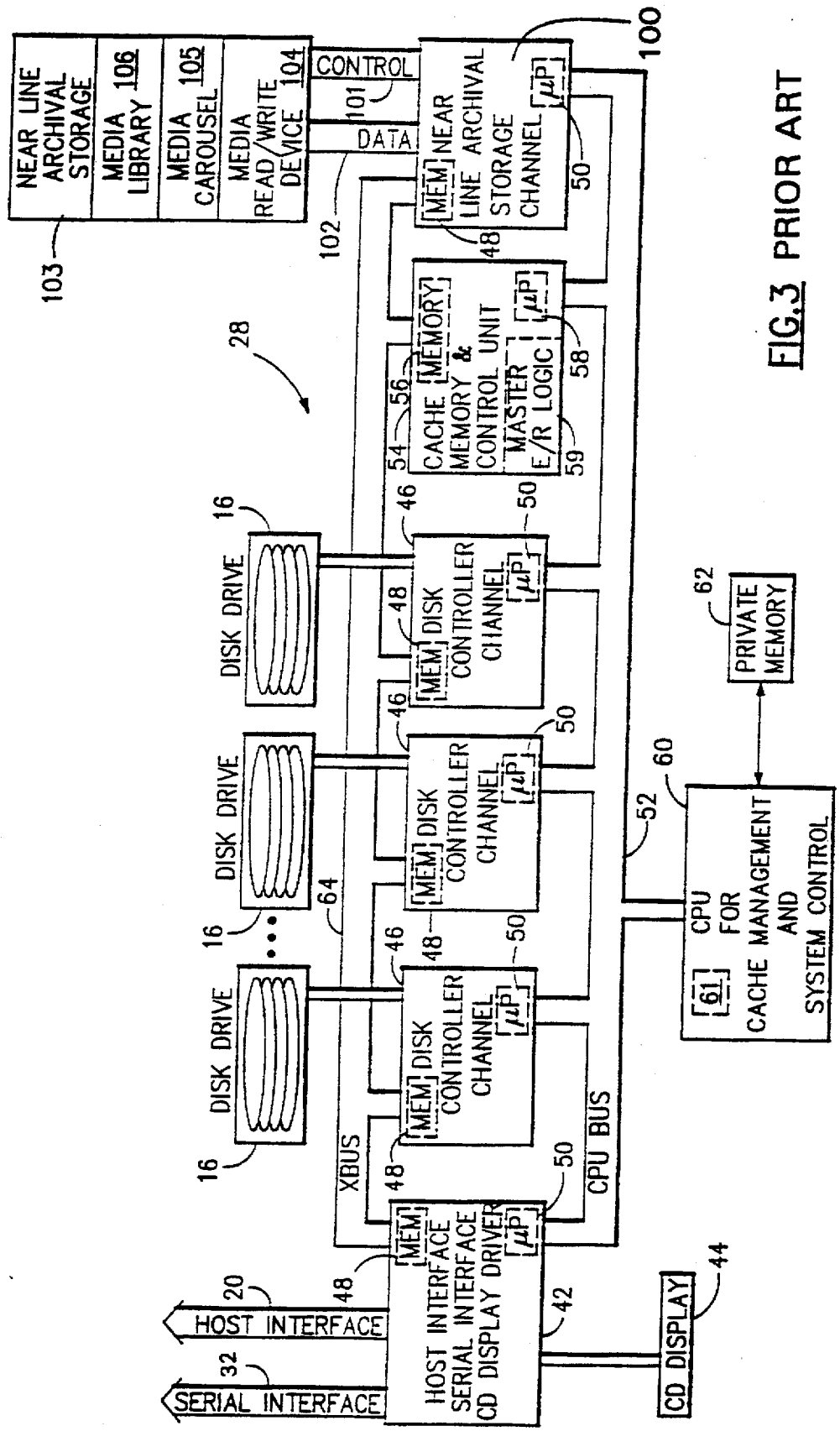
FIG. 3 is a prior art simplified block diagram of the disk memory platform of the system of FIG. 2.

The redundant disk computer system according to one embodiment of the present invention provides a targeted data transfer from the SCSI host (e.g. 40) to a selected device in a redundant array media comprising a selected number or targeted disks (e.g. 50 and 55) from among disks 50–55 as well as to the computer central memory (60) with a single, simultaneous transfer of data over the data bus from the SCSI host (40) through the host adapter (80), the data bus (72) and the enhanced redundant array media adapters, called disk adapters (e.g. 90 and 95) in the present embodiment, as well as directly to the computer central memory 60 according to operating system control from controller 110 via control bus 74. Moreover, according to the present invention, the number of redundant disks, as well as the corresponding enhanced disk adapters, may be theoretically indefinitely increased, each providing simultaneous reception of data from the host 40 during a single data bus 72 transfer cycle. Also, while the embodiment of the present invention shown in FIG. 7 includes addition hosts 41, 42 and 43 connected to host corresponding adapters 80 and 82, the number of independent SCSI (or other) hosts which may present data to the data bus 72 via other corresponding adapter card(s) (not shown) may also be theoretically increased indefinitely, limited only by system physical considerations.

The particular inventive features according to the present invention providing for the targeted broadcast of data is provided in one detail below, the remaining associated software and hardware implementation details, such as operating system, and data bus an SCSI interface implementation, being generally known in the art. For instance, U.S. Pat. No. 5,257,367 entitled "Data Storage System with Asynchronous Host Operating System Communication Link" by Goodlander, et al. provides such illustration.

A. General Description of Prior Art Host Computer Systems with Associated Mass Storage Systems (FIGS. 1 through 6) as Described in the Above Referenced Patent A given system's overall performance capability is the result of the integration of a number of independent technologies whose individual growth in performance/capability over time differs markedly from each other.

FIG. 1 shows a typical prior art computer system employing disk drives for storage. The host computer 10 (i.e. the one interfacing with the computer operators) includes an operating system 12. The computer 10 has a disk controller 14 connected thereto and the disk controller 14, in turn, is connected to four disk drives 16. In use, an applications program (not shown) makes a request for data from the operating system 12. Knowing from tables that the requested data is on a particular disk drive 16 at a particular track between starting and ending sectors, the operating system 12 outputs a disk read request on line 18 to the disk controller 14. The disk controller 14, in turn, then issues a read request to the appropriate disk drive 16 on its connecting line 20 which causes the read head (not shown) within the disk drive 16 to move to the designated track and then read data and output it to the disk controller 14 on the line 20 from the starting sector to the ending sector. When the data has been received by the disk controller 14 (into an appropriate cache/buffer memory, the operating system 12 is informed by an appropriate signal on line 18.

In the above-referenced Goodlander patent, the system of which is described next herein below as illustrative of the systems in which the present invention may be embodied, a high-speed, high-capacity, fault-tolerant, error-correcting storage system was disclosed which provides a solution for many of the above-described needs of modern computer systems (both military and commercial).

An computer system employing both disk and near line archival storage and typical of the systems in which the present invention may be employed is shown in FIG. 2 where it is generally indicated as 22. The system 22 has a host computer 10 containing an operating system 12 with its tables 24. There is also a console privilege interface 26 by means of which outside user consoles (not shown) can be used to access the host computer operating system 12. There is once again a disk controller 24 since there is no change to the operating system 12 and the operating system 12 is set up to interface with the disk controller 24. Rather than being connected directly to the disk drives 16 as in the prior art approach of FIG. 1, however, the single line 20 from the disk controller 24 is connected to an intelligent disk platform 28. The disk platform 28 is then connected to interface with the disk drives 16 through lines 30. Additionally, the disk platform 28 has a bi-directional connection 32 through a communications link 34 to the console privilege interface 26. In the preferred embodiment as applicable for large-scale storage systems, there is also near line archival storage apparatus 36 connected to the disk platform 28 through line 38. To perform within the system 22 of this invention which will be described in Section B of the present description, the near line storage apparatus 36 should be of an automated variety selected from any of a number well known in the art where off-line storage media are loaded for reading and writing on request by automated mechanisms so as to avoid the necessity of operator intervention.

To accomplish its unique improvements over the prior art, the disk platform 28 includes its own computing capability as represented by the computer block 40. As will be seen shortly, the computer 40 may, in fact, comprise multiple processing units; but, for the present it is sufficient to note that the disk platform 28 is not the "dumb" controller 14 of the prior art. Employing the bi-directional connection 32 through the communications link 34 to the console privilege interface 26, the computer 40 can find the location of data from the tables 24 of the operating system 12. The location of data within the disk drives 16 or the near line archival storage apparatus 36 is, therefore, transparent to both the operating system 12 and the applications programs requesting it. If requested data is located on the near line archival storage apparatus 36, it can be retrieved automatically and then be relayed to the operating system 12 just as if it was on one of the disk drives 16. More importantly, computer 40 is of the self learning variety which learns through experience. Thus, for example, if a particular file from the near line archival storage apparatus 36 is used at a given time and/or day each month (as in preparing a payroll), the logic of the computer 40 will learn that from experience and begin loading the file from the near line storage apparatus 36 in anticipation of the expected request so that when the request is made, the file is already read in and available for use. Thus, the overall system performance of the system 22 of the prior art is not only improved for a given level of file location transparency to the users; but, additionally, the overhead drops as the system learns the repeated patterns of use associated with its users. In addition, whereas the prior art approach of FIG. 1 could only do system and equipment diagnostics by taking the computer 10 off-line or by increasing the complexity and overhead of the operating system 12 once again by having the operating system 12 perform such functions in a background mode, the storage system and equipment diagnostics are now performed by the computer 40 located within the disk platform 28 on a continuing and time-available basis. When the disk drives 16 have a fault or error, any errors and problems found can be corrected or at least pin pointed for operator correction and replacement without taking the system 22 off line or causing any significant degrading of the performance thereof.

Having thus described a preferred overall system approach to storage systems of the prior art, attention will now be turned to a preferred construction of a disk platform 28. That system employed individual disk channel controllers for respective ones of the disk drives 16 and each of the disk channel controllers included a cache/buffer memory. All the disk channel controllers were controlled by control signals from a common control computer and both data and the control signals employed the same bus. As depicted in FIG. 3, the preferred disk platform 28 of this disclosure has been restructured to greatly improve the performance while, at the same time, also substantially reducing the complexity whereby the reliability is increased and the implementation thereof is greatly simplified with attendant known benefits.

In FIG. 3, line 18 is labeled as the "SERIAL INTERFACE" and line 20 is labeled as the "HOST INTERFACE". In a tested embodiment, the SERIAL INTERFACE of line 18 is an RS-232 interface and the HOST INTERFACE of line 20 is a SCSI (small computer system interface) interface. This choice was as a result of the availability of commonlyused equipment for use in testing only and those skilled in the art will readily recognize and appreciate that the same techniques being described here by way of example could be accomplished employing other hardware interface methods and apparatus known in the art, or yet to be developed. The two lines are connected to a interface and driver unit 42 which provides the host interface, serial interface, and LCD display driver functions as indicated therein. The logic and apparatus of interface and driver unit 42 is also connected to a display 44. The display 44 is not an absolute requirement; but, is preferred so that messages can be provided to an operator as, for example, in the event of a detected malfunctioning disk drive 16 which has been removed from operation and should be replaced in order to restore full system capability.

There are a plurality of disk controller channels 46 connected to respective ones of a plurality of disk drives 16. It is preferred for error detection and correction optimization that at least one extra disk controller channel 46 and associated disk drive 16 be up and running at all times to be used as a "hot" replacement in the event of a detected error or potential problem. Thus, it is preferable to dynamically substitute a disk channel and let the problem channel be fixed by service personnel off-line. When repaired, that channel can then become the hot replacement. Each of the disk controller channels 46 again has a cache/buffer memory 48 associated therewith. Where the memory of the disk controller channels performed the dual function of a memory buffer into which to read and from which to write with respect to the disk drive connected thereto and a cache memory, the memories 48 of this invention in general perform the buffer function. It is preferred that the memories 48 be sized to be involved in more than one transfer at a time so that at least one stream of data can be read into the memory 48 while another stream of data is being written out of the memory 48. In many such systems of the prior art, the disk controller channels were dumb or had little memory capacity; that is, they did not include any computing power. Thus, the disk controller channels had to be fed a stream of low level commands, resulting in a large amount of non-data traffic sharing the bus with the data. That, of course, reduced the overall throughput of data along the bus. In the "intelligent" disk controller channels 46, the disk controller channels 46 are provided only with high level command signals and accomplish the balance of the indicated read and write functions internally with the micro-processors 50. Thus, the amount of non-data traffic on the CPU bus 52 is greatly reduced, allowing more available time for the transfer of data—which, of course, should be the primary function thereof for optimum system performance.

A significant element of this system is the cache memory and control unit 54. While the memories 48 of the disk controller channels 46 in the tested embodiment are each 8K bytes in size, the cache memory 56 of the cache memory and control unit 54 is 16M bytes. The cache memory and control unit 54 also includes its own microprocessor 58 and master error recovery logic 59.

Finally, the preferred disk platform 28 includes a central processing unit (CPU) 60 with its own private memory 62. The CPU 60 is employed for cache management and system control functions in a manner to be described shortly. As shown in FIG. 3, the above-described components with the exception of the CPU 60 are interconnected to communicate with one another by the XBUS 64 and interconnected to communicate with the CPU 60 by means of the CPU bus 52.

As mentioned above, not only is the transfer of data between the memories 48 and the disk drives 16 done asynchronously; but, additionally, transfers into and out of the cache memory 56 is done asynchronously. Because of its size (i.e. 16M bytes) the cache memory 56 can be employed for transfer of multiple requests from the host computer 10 at one time. Because of access times of the disk drives 16, lengths of transfers requested, and/or data portions already in the cache memory 56, the requests to read and write data from the CPU 60 to the disk platform 28 may not be responded to in the order received. As soon as a request is completed, no matter its position in the request sequence, the CPU 60 is informed that it is completed. Thus, throughput as seen by the host computer 10 is greatly improved.

The CPU 60 includes an embedded array disk operating system 61 and employs its private memory 62 to keep track of the contents of the cache memory 56 so that it can respond optimally to requests from the host computer 10. The CPU 60 in this system only issues high level commands to the disk controller channels 46 so that the multiple, low-level command approach, which occupied valuable time on the CPU bus 66, is eliminated. The micro-processors 50 each contain firmware that not only performs the actual low-level command steps required to do disk transfers; but, in addition, performs continuing self-testing of the individual controller channel on a time-available basis to assure that the components are continuing to work properly. Should such self-check indicate a potential problem, the CPU 60 then conducts further testing of the subject disk controller channel 46 to see if an on-line "hot" spare disk drive 16 or disk controller channel 46 should be employed while the malfunctioning unit is flagged for work on the display 44 and removed from use temporarily.

By putting the CPU 60, by way of micro-processor 58, in complete charge of transfers between the memories 48 and the cache memory 56 the problem of dealing with bus arbitration on the XBUS 64 is also eliminated.

Figure 4:
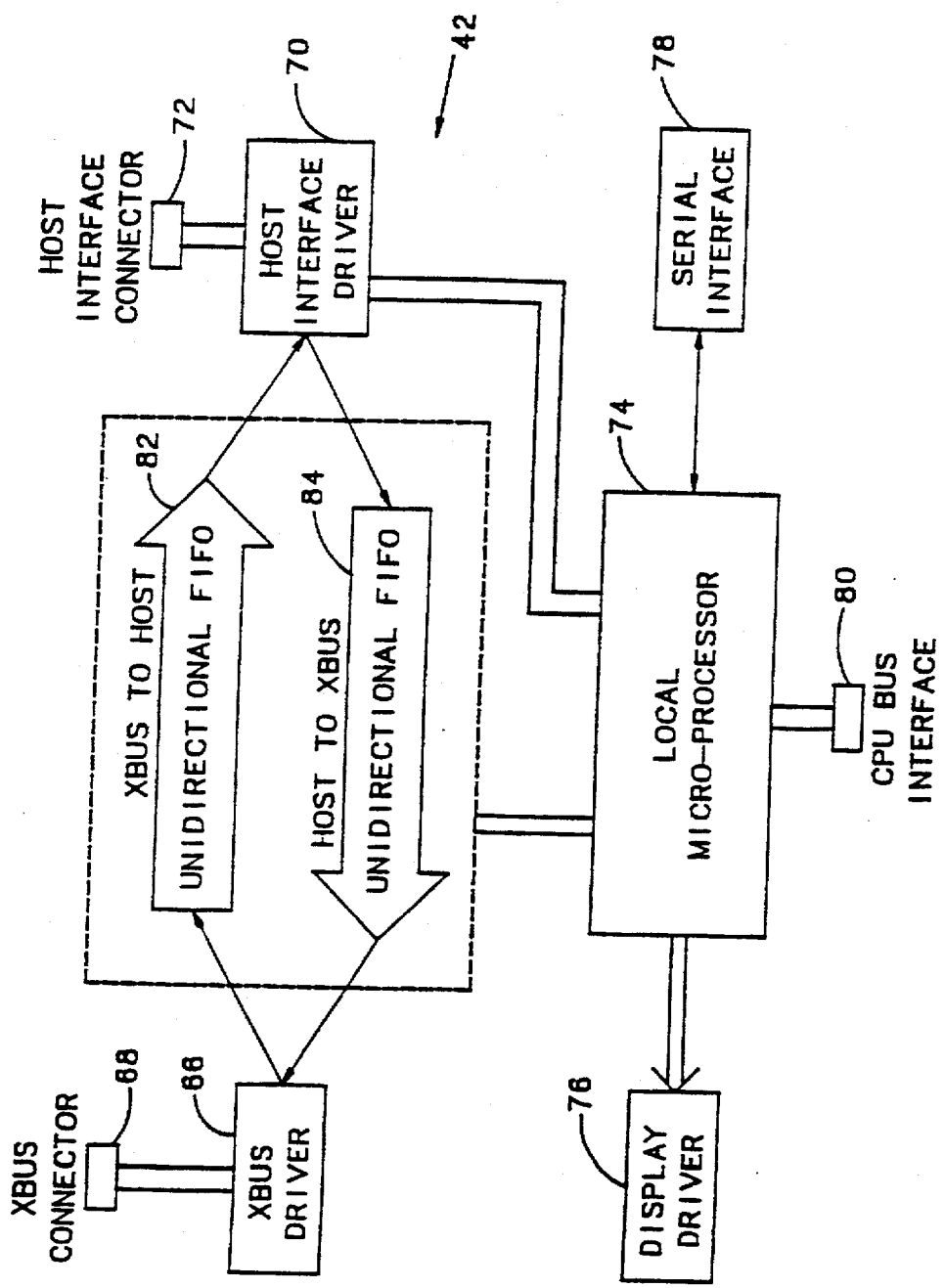
FIG. 4 is a prior art simplified block diagram of the host interface block of the disk memory platform of FIG. 3.
Figure 5:
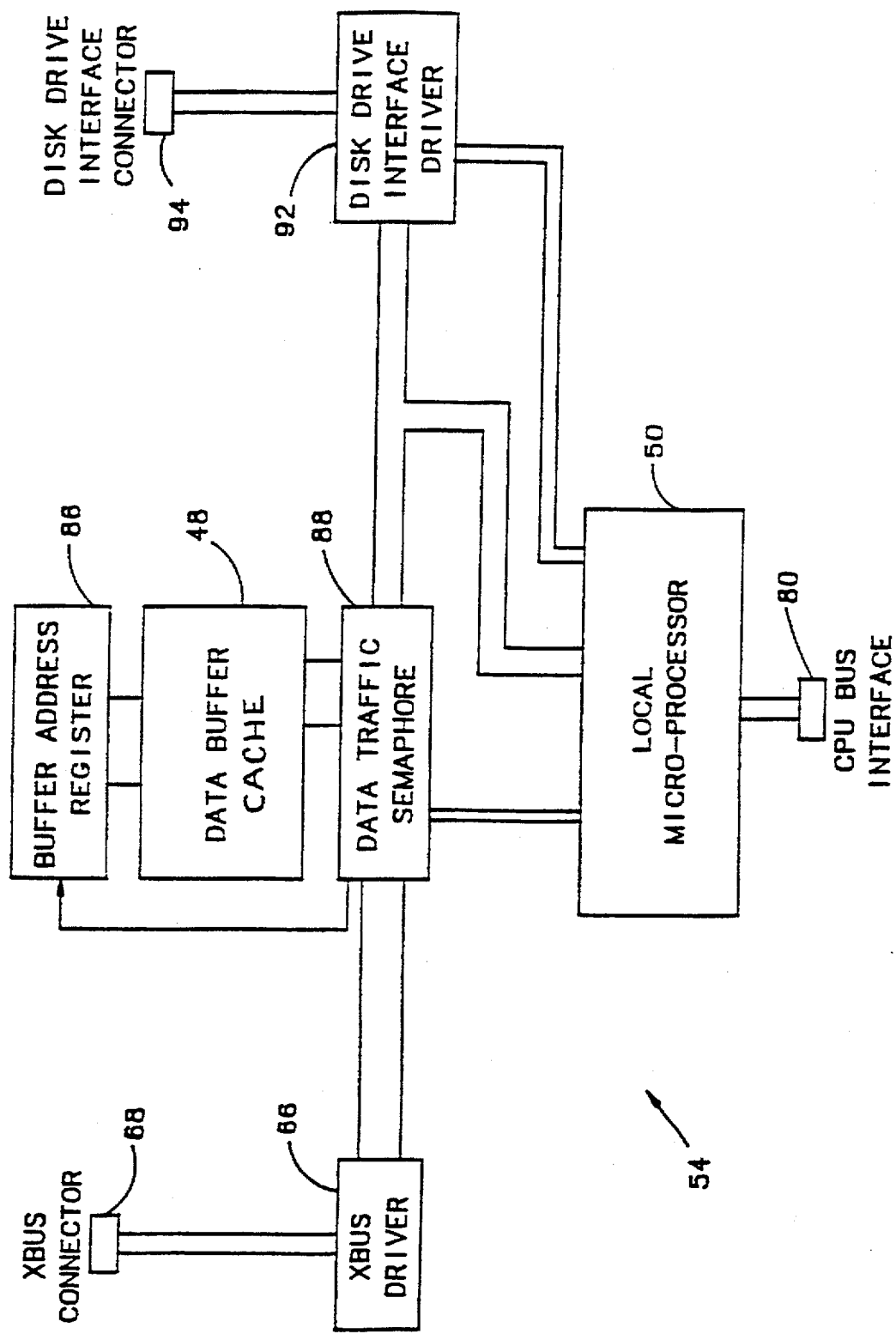
FIG. 5 is a prior art simplified block diagram of the one of the disk controller channels of the disk memory platform of FIG. 3.

To get a better idea of the operation of the disk platform 28, we will now turn to FIGS. 4 and 5 with particularity. FIG. 4 shows further details of the interface and driver unit generally labeled as 42 while FIG. 5 shows further details of one of the disk controller channels 46. With reference first to FIG. 4, there is an XBUS driver 66 connected to the XBUS 64 with a connector 68. There is also a host interface driver 70 (SCSI in the tested embodiment) connected into line 20 back to the host computer 10 by a connector 72. As with the other elements, there is also a local micro-processor 74 to control the operation of the elements of the interface and driver unit 42. The micro-processor 74 interfaces with a display driver 76 (which is connected to the display 44) and a serial interface driver 78 (which is connected to the serial interface on line 18). All the driver elements are well known to those skilled in the art and will be chosen according to the type of device with which they must interface. The micro-processor 74 is also connected to the CPU bus 52 with connector 80. The heart of the interface and driver unit 42 and most important part thereof is a pair of unidirectional FIFOs 82 and 84. Under the control of the local micro-processor 74, FIFO 82 receives and transmits data from the XBUS 66 to the host computer 10. Similarly, FIFO 84 receives and transmits requests and data from the host computer 10 to the XBUS 66. Thus, bi-directional transmissions can take place between the XBUS 66 and the host computer 10. This The disk controller channels 46 depicted in FIG. 5 also includes an XBUS driver 66 and a disk drive interface driver 92 connected to the associated disk drive 16 with their associated connectors 68, 94. Similarly, the local micro-processor 50 is connected to the CPU bus 52 with a connector 80. In addition to the data buffer memory 48, there is a buffer address register 86 which controls the locations in the memory 48 which are accessed and a data traffic semaphore 88 which operates in a manner readily apparent to those skilled in the art to control access to and from the memory 48 under the control of the micro-processor 58. Thus, it is the data traffic semaphore 88 which actually inserts the addresses into the buffer address register 86. The data traffic semaphore 88 must be present to prevent simultaneous access to the memory 48 by both the XBUS 64 (and elements connected therethrough) and the host computer 10. Such devices are well known and employed in the computing art for that purpose as any attempt to simultaneously read from and write into a memory location can cause irreversible errors.

The near line archival storage channel 100 is controlled in the same manner as disk controller channel 46 through micro-processor 50 and cache/buffer memory 48 and contains the logic to control by way of control bus 101 the near line archival storage 103 and its individual elements 104, 105 and 106 to read and write data by way of data bus 102. Data read from near line archival storage 103 is held in cache memory 56 or on disk drives 16 and is accessed by the host computer with sector numbers beyond the physical limits of disk drives 16 creating a virtually boundless storage capacity.

Figure 6:
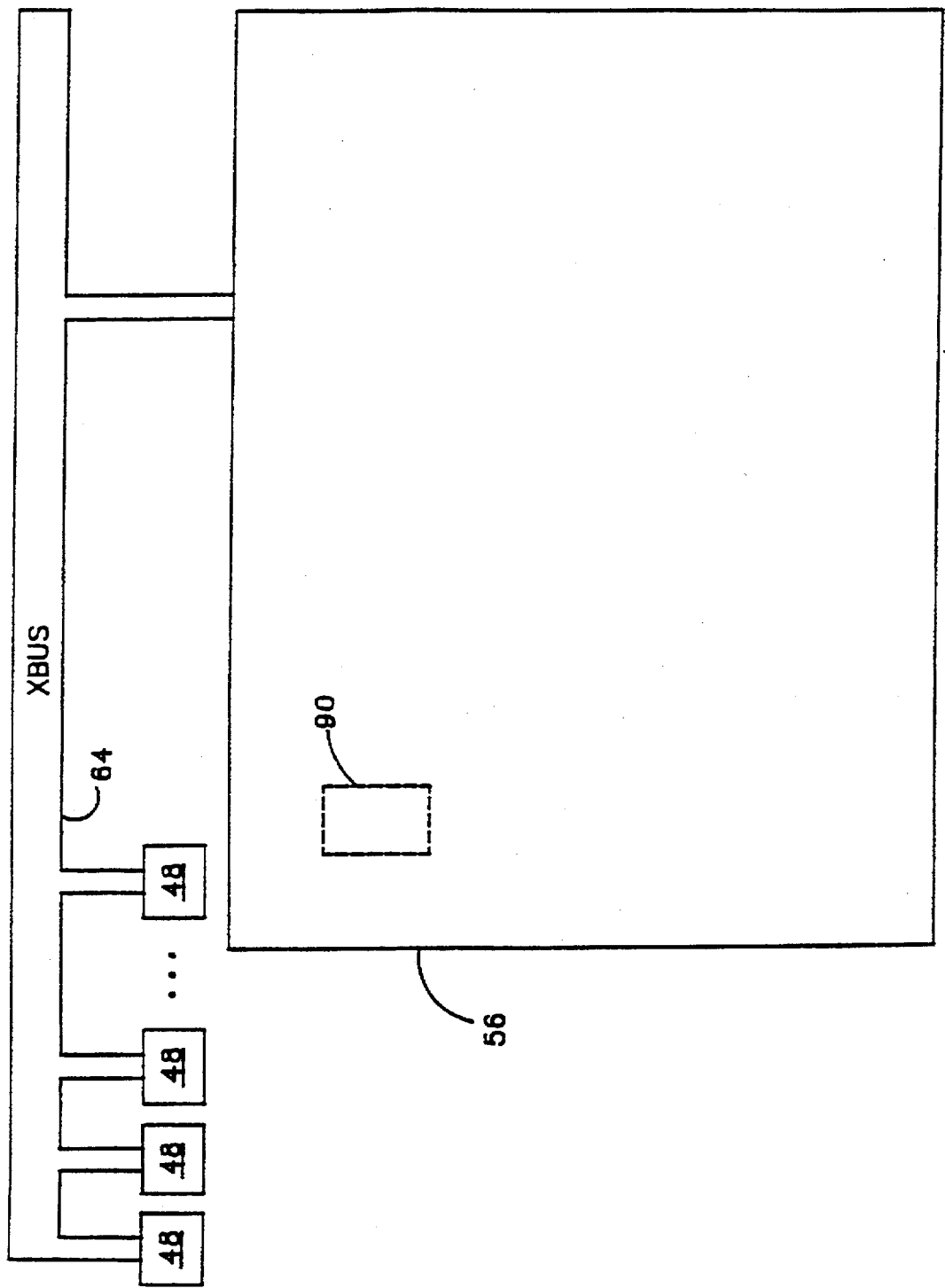
FIG. 6 is a simplified drawing employed for an example to show the dual asynchronous operation of the system of FIG. 2.

Having thus described the construction and operation of a system 22 in general, a more specific example of its unique mode of operation will now be described with reference to FIG. 6. For simplicity, FIG. 6 depicts in simplified form only the cache/buffer memories 48 in the channels and the cache memory 56 as connected by the XBUS 64. Assume that a request has been made by the host computer 10 to read data. The disk platform 28, of course knows (or can determine) the location of the data in the disk drives 16 through its above-described access to the tables 24 in the host computer 10. According to fault tolerant techniques, the data (and its parity bits) are spread across the disk drives 16. From the contents of its private memory 62, the logic in the CPU 60 knows the present contents of the cache memory 56. Anything that is already in the cache memory 56 will not be re-read, of course, which is the usual function of any cache memory (i.e. to eliminate redundant and unnecessary disk accesses). The CPU 60 then issues high level requests to the various disk controller channels 46 to have them retrieve the elements of the data from their locations on the disk drives. The requests also go to the cache memory and control unit 54 so that it knows what is going on. From there on, the collection of the data and its transfer to the host computer 10 is under the control of the micro-processor 58 in the cache memory and control unit 54. The micro-processor 58 assigns available buffer space (as indicated by the dashed box 90) in which to receive the data of the request. The data segments are asynchronously brought into the buffer memories 48 under the control of the micro-processors 50 as a function of the originally-issued high level commands from the CPU 60. As the data segments are received, the micro-processor 58 is advised by the micro-processors 50 over the XBUS 64. The micro-processor 58 then asynchronously transfers the data segments into their appropriate location within the assigned buffer space 90. When the entire data of the request is in the assigned buffer space 90, the micro-processor 58 transfers it to the host computer 10 through the FIFO 82 described above. A write operation, of course, operated in much the same manner, except that data flow is in the opposite direction.

While only shown in simplified representation in FIG. 6, it may be appreciated therefrom and from a consideration of the elements and their method of operation as described above that the single cache memory 56 of substantial size as employed in this prior art embodiment effect a vast improvement in simplicity and efficiency of operation (i.e. speed). Because of its size, the cache memory 56 will actually self-optimize the data it retains in cache over time so as to minimize the number of data transfers required with the disk drives. In this regard, it is important to recognize that the parity bits associated with data are contained in separately transferable locations on the disk drives 16. Thus, over the course of time the most used data and their parity bits will be virtually permanent residents of the cache memory 56 and will only be written to the disk drives 16 for back-up purposes on a time-available basis in a background mode by the micro-processor 58. The impact of this on the overall performance of the system 22 should not be overlooked or minimized. Consider, if there are eight disk drives 16 containing the individual data bits of data and a ninth disk drive 16 containing the parity bits associated therewith, if the parity bits are contained in an unused portion of the cache memory 56 and only written to the ninth disk drive 16 when the eight disk drives 16 are not otherwise involved in an actual data transfer, disk access time to access data is reduced by one-ninth or eleven per-cent. The savings in time could be even more substantial in an instance where one of the eight disk drives 16 containing the data bits is malfunctioning and the parity bits are required to correct any errors in the data stream.

Figure 7A:
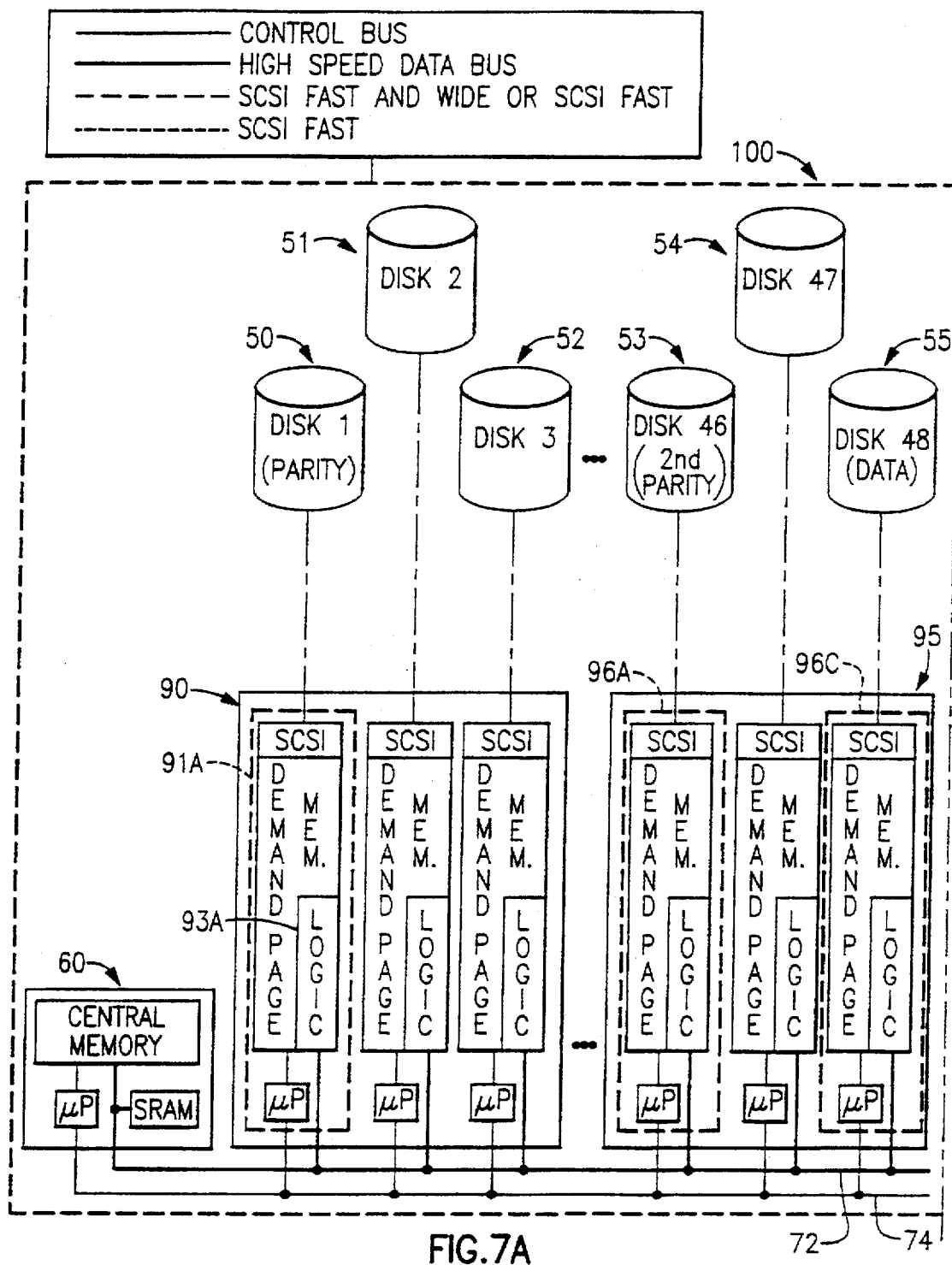
FIG. 7 (7A and 7B) is one embodiment of a redundant array computer system according to the present invention.
Figure 7:
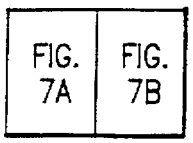
Figure 7B:
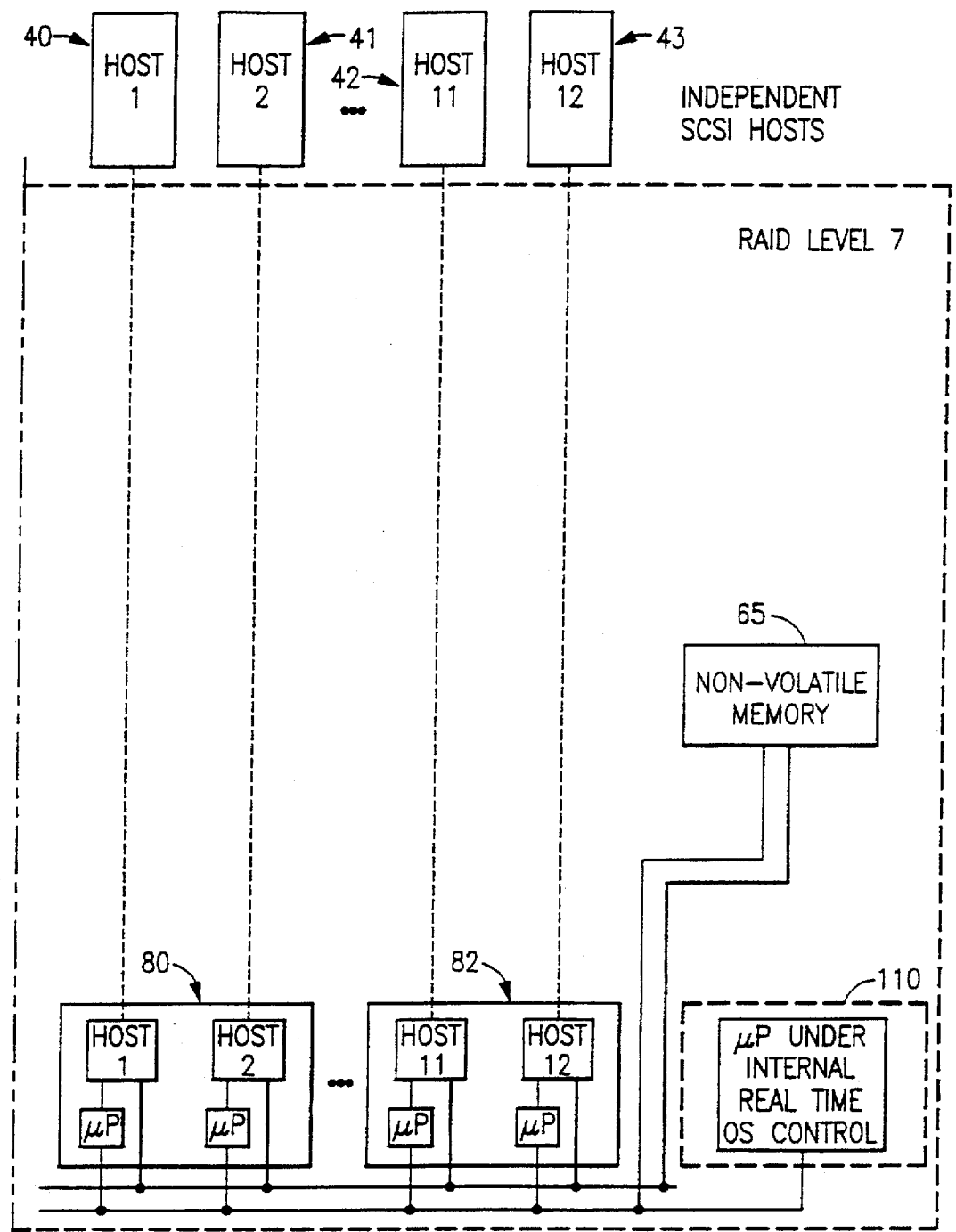
Figure 8:
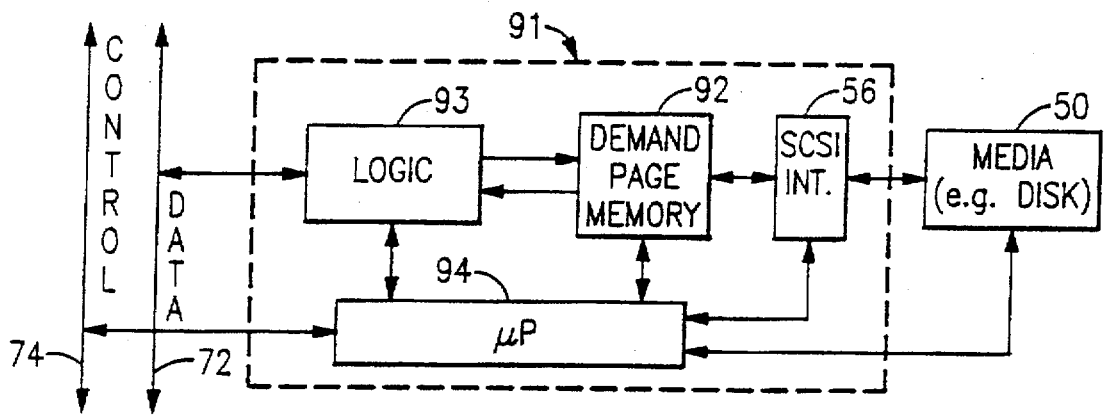
FIG. 8 is a more detail block diagram of one section of a triple disk adapter according to the embodiment of FIG. 7.
Figure 9:
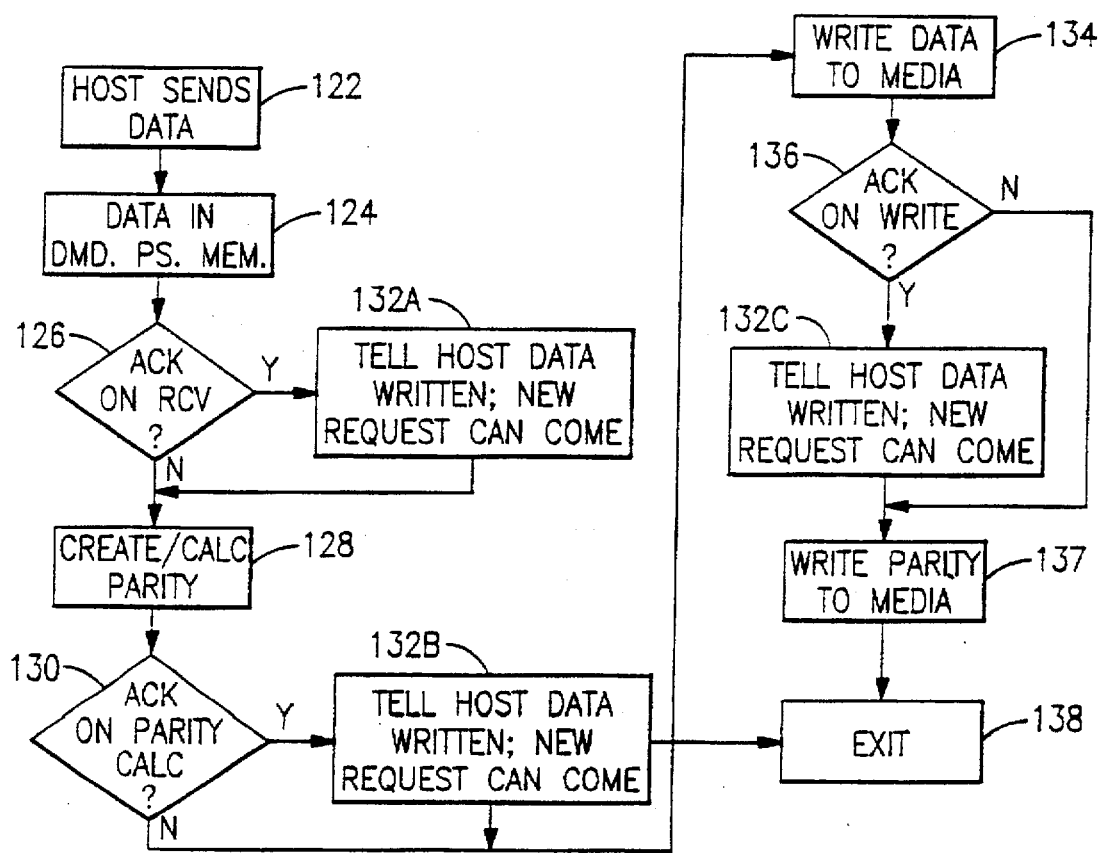
FIG. 9 is a flow chart of an operating system acknowledge operation according to the embodiment of FIG. 7.

B. Description of the Invention (FIGS. 7, 8 and 9)

When a host is writing data to one or more redundant array disks according to one embodiment of the present invention, such as a host 40 writing to a parity disk (e.g. 50) and data disk (e.g. 55), the data read from the host 40 is placed on the data bus 72 by host adapter 80 and is simultaneously read by a portion 91A of the disk adapter 90 as well as an identical corresponding portion 96C of disk adapter 95. However, before the new host data can be placed on the data disk 55, the old data and parity must be retrieved from the respective parity and data disk (50 and 55, respectively). The data can be retrieved prior to the host presentation of data with a prefetch operation performed as described in more detail below, resulting in further system performance enhancements, or may alternately be made at the time the new data to be written is presented. Moreover, the data presented to the data bus 72 by the host adapter 80 and read by the disk adapter portion 91A and 96C is read simultaneously during the same data bus cycle by the computer central memory 60, thus establishing a "broadcast" of data from the host 40 to the computer central memory array 60, the disk adapter 90 and the disk adapter 95 in one data bus cycle. The reception of the data during that cycle is targeted to the portion 91A and 96C according to operating system (OS) control by the OS device 110 via control bus 74, which could further target additional devices on the data bus to simultaneously receive the data which was broadcast from its source.

As all disk adapters (e.g. 91A, 96C) include logic (e.g. XOR logic) for parity calculation, the disk adapter portion 91A corresponding to the parity disk 50 provides a combination (e.g. XOR) of the old parity (from parity disk 50) with the new data received from the host over the data bus. The further details of implementation of selected devices to selectively read data broadcast on the data bus according to a particular operating system signals are known to those of ordinary skill in the art.

To complete a typical host-to-disk data transfer, a single subsequent bus cycle transfer of data on the data bus occurs when the old data, for instance, from disk 48, is read and placed on the data bus 72 by portion 96C of the disk adapter 95 and read by portion 91A of disk adapter 90. New parity information is provided by the logic element 93A which, in this example, includes exclusive-OR (XOR) logic which provides an exclusive-OR of the previously received new data and old parity and then with the latter bus cycle received old data. However, since the demand page memory (cache) memory and the capability of XORing data is distributed among the various disk adapters, and the computer memory array 60, the computer according to the present invention can include various operating system scenarios as determined by the location of the required data and parity, and the host acknowledge (ACK) mode. As determined by the user or the operating system programmer, the host acknowledge mode, discussed in more detail in FIG. 9, provides a trade-off between data and data writing speed and data integrity.

The preferred embodiment of the present invention may also include a further (second) parity drive, e.g. 53 connected to the data bus 72 by a corresponding disk adapter portion 96A. Two (or more) parity disks function according to OS control as exemplified by the use of P and Q parity drives in RAID level 6 systems, but have enhanced performance according to the present invention. Typically, any such additional parity (or data) disk adapter 53 also reads the data from the data bus simultaneously with the disk adapters portions 91A and 96C during the same data bus cycle, as may other devices, such as the computer memory array 60 and the non-volatile memory 65.

The apparatus and method according to one embodiment of the present invention provides similar improvement in the transfer of data READ from the redundant array of disks wherein a single transfer of memory READ from any designated disk will be broadcast on the data bus 72 to a selected target for receipt thereof. For instance, if data is read from a selected disk drive in the redundant array, it is converted to a data bus form by a corresponding portion of the disk adapter and placed on the data bus 72, and read simultaneously by the host adapter of a designated host, and, if not already present in the computer memory array 60, by that computer memory device. Furthermore, it is according to the scope of the present invention that other simultaneous READs by targeted destinations be provided.

The system 100 typically includes non-volatile memory 65 which selectively stores data from the data bus 72 according to control provided by the controller 110 under OS control. According to the present invention, the non-volatile memory 65 simultaneously reads the data from a host (via corresponding host adapter) as does the parity and data disk adapters during the same bus cycle according to a control bus 74 signal.

The individual portion 91A (of three substantially identified portions) of disk adapter 90 is shown in more detail in FIG. 8, wherein exemplary portion 91 includes a demand page memory bus 92 (cache) which receives data from a data bus 72 via logic 93 under control of a micro-processor 92 which is, in turn, responsive to operating system (OS) control as provided via a control bus 74. The demand page memory 92 is double-ported, and provides communication with one of the redundant array media devices, such as a disk 50, via a SCSI interface 56 under control of the microprocessor 94, in responsive to the operating system as discussed above. When data is read from the media 50 to be placed onto the data bus for targeted data broadcast, as discussed above, the media data is received by the SCSI interface 56 and then by the demand page memory 92 by the corresponding memory data port. The data is then placed directly on data bus in an acceptable data bus format via logic 93, which includes the appropriate data buffers and other data bus associated hardware.

When data is to be read from the data bus during a particular targeted broadcast data bus cycle, data is removed from the data bus and passed through the logic 93, which will place it initially into the demand page memory 92. If, as in this instance, the disk 50 comprises a parity disk, the new data is initial XOR'd with the old parity from the parity disk 50 and stored in the demand access memory 92. Subsequently, the old data is transferred into the disk adapter 91 from the corresponding data disk 55 and its associated disk adapter 96C, and read by the disk adapter 91 during the second of the two consecutive bus cycles, and combined with the new parity data (previously XOR'd and stored in the demand page memory 92 after the first of the bus cycles), to then be again stored in the demand page memory 92 for transfer to the parity media 50.

Although, the logic 93 comprises exclusive-OR (XOR) logic to provide the updated parity information, other logic elements maybe included therein to provide desired distributed logic data operation(s) such as CRC calculations and updates as may be controlled by the OS via control bus 74. For the example where logic 93 comprises exclusive-OR logic, data is read from the memory 92 is a READ-modify WRITE (RMW) cycle and provided to the exclusive-OR logic 93 whereupon that data is exclusive-OR'd with the incoming data and read into the demand page memory as part of the RMW cycle. Other memory cycles or operations are within the scope of the present invention.

The prefetch operation, discussed above, according to one embodiment of the present invention is individually operable on the disk adapter cards (e.g. 90, 95). A prefetch READ of the disk data preceding the requested WRITE on to the disk with data or parity is provided after a WRITE in anticipation of a subsequent or consecutive READ or WRITE operation, or provided to bring in the next block of data along a horizontal or vertical physical memory boundary of the disk.

According to one embodiment of the present invention where the improvements in data transfer affect particular details of system operations, it is important to consider the data transfer acknowledge to the host (e.g. 40) as sequences of data from it is transferred into the redundant array computer system, as illustrated in more detail in FIG. 9. The present embodiment provides a data flow of subsequent data according to a particular acknowledge (ACK) mode selected by a particular operating system or the system user. When the host 40 sends data as in step 122, the data is then read by the targeted disk adapter and placed in the demand page memory at step 124. If the operator or the operating system has elected, at step 126, to acknowledge data 'on receipt' of the data, then the host supplying the data is informed that the data has been written and that a new data request can come, at step 132A; the routine then resumes at step 128 where parity is created or calculated. Alternatively, if acknowledge 'on receipt' is not to be selected, the parity is calculated or created at step 128. Thereafter, if the operator or operating system has elected to acknowledge 'on parity calculation', step 130, the host is then informed that the data has been written and that a new data request can come, at step 132B, and the routine resumes at 134 where the data is written to the media. Further alternatively, if acknowledge is not to be provided on either receipt of data or parity calculation, the data is written to the media at step 134. Thereafter, if the operator or operating system has elected to acknowledge to the host (40) 'on write', step 136, the host is then informed that the data has been written and that a new data request can come, at step 132C, and the routine then resumes at step 137, where the parity is written to the media. Alternately, if there is to be no acknowledge 'on write', the routine resumes at step 137. The routine the exits at step 138.

The designation of specific disks as data and parity disks described above was made by way of example only; for other configurations or data transfers according to the present invention, other disks in the redundant array may be defined and function as data and parity disks.

C. Operation of the Invention

The RAID 7 Operating System software decides the most efficient transfer process at the time the transfer takes place. If it has selected the use of multiple transfers, then the OS "arms" the hardware of each of the particular devices that it wants to receive the data. Then the OS initiates the transfer process, one time, over the XBUS and each armed board receives the data. The various process steps of XOR and subsequent transfer steps then take place. Consider the following:

Example One: Host is Writing Data

In the architecture of the present invention, the objective is to optimize the time spent transferring data on the XBUS. Since cache memory and the capability of XORing data is distributed among the triple adapters and the array processor, there are several possible scenarios which can occur, each exhibiting their own performance characteristics, but each being significantly improved over prior art performance. The scenario selected by the RAID 7 operating system is essentially based on two variable—the host ACK mode, and the location of the required data and parity.

The 'old' data and parity must be retrieved first before the new host data can be updated into the RAID 7. This is accomplished by reading them from their respective drives into triple adapter memory. A prefetch algorithm anticipates the need for old data and parity. The new data, once received into host adapter memory, is transferred from the host adapter OVER THE XBUS to array processor memory, the 'data' triple adapter memory, and XORed into the 'parity' triple adapter memory in a single, simultaneous event.

The old data is then removed from the parity by transfer from one triple adapter OVER THE XBUS to the parity triple adapter which has XOR enabled.

Example Two: Host is Reading Data

The data being sent to the host must be transferred to the host adapter, but can originate in three sources: the data drive, the data triple adapter memory, or the array processor memory. In any case, a single transfer will bring it to the host adapter. If the data is already in array processor memory, it is transferred directly to the host adapter OVER THE XBUS. If the data is in triple adapter memory, it is transferred OVER THE XBUS to array processor memory and simultaneously to host adapter memory.

Furthermore, the redundant array media used according to the present invention may be independent mass storage media devices other than the inexpensive disk drives discussed above. Moreover, the scope of the present invention includes the operating system implementations of the control of the disk (or media) adapters according to the present invention as may be implemented by one of ordinary skill in the art. Other modifications and substitutions made by one of ordinary skill in the art are considered to be within the scope of the present invention which is not to be limited except by the claims which follow.

We claim:

1. A redundant media device mass storage system for use with a host computer for storing data and related parity information, comprising:

a host adapter connected from the host computer for controlling operations of the redundant media device mass storage system, a plurality of media devices for storing data and parity information, a plurality of media adapters, each media adapter corresponding to and connected to a media device and including parity logic, and a data bus and a control bus connected between the host adapter and the plurality of media adapters, the media adapters being connected in parallel from the data bus and the control bus, wherein in a first bus transfer operation, the host adapter is responsive to a new data write request from the host computer for providing a corresponding identification of a data media device storing old data corresponding to the new data and a parity media device storing parity information relating to the old data on the control bus and the new data on the data bus, the new data being broadcast on the data bus to each of the plurality of media adapters in parallel, and the data and parity media adapters corresponding to the data and media devices are responsive to the identifications of the media devices for reading the old data and the corresponding parity information from the corresponding data and parity media devices and in the data media adapter, receiving the new data from the data bus, and in a second bus transfer operation, the data media adapter broadcasts the old data on the data bus to each of the plurality of media adapters in parallel and writes the new data to the corresponding data media device, and the parity media adapter receives the old data from the data bus and the parity logic thereof generates new parity information from the old data, the new data and the old parity information, and writes the new parity information to the corresponding parity media device.

2. The redundant media device mass storage system of claim 1, further comprising:

in each media adapter, a demand page memory connected between the corresponding media device and the data bus for storing data or parity information read from the corresponding media device and received from the data bus, and storing copies of a part of the data or parity information stored on the corresponding media device and responsive to data read and write requests from a disk platform for providing the copy of the corresponding stored data or parity information stored in the demand page memory.

3. The redundant media device mass storage system of claim 2, further comprising:

in the host adapter, a storage system processor executing a storage system operating system for controlling operations of the redundant media device mass storage system, the storage system operating system including demand paging functions, and each media adapter being responsive to the storage system operating system for reading pages of stored data or parity information from the corresponding media device and storing the pages of data or parity information in the demand page memory in anticipation of read and write operations.

4. The redundant media device mass storage system of claim 2, further comprising:

in the host adapter, a storage system processor executing a storage system operating system for controlling operations of the redundant media device mass storage system, the storage system operating system including prefetch functions, and each media adapter being responsive to the storage system operating system for prefetching stored data or parity information from the corresponding media device in anticipation of read and write operations.

5. The redundant media device mass storage system of claim 1, further comprising:

a central memory connected from the data bus in parallel with the plurality of media adapters for receiving new data broadcast on the data bus in the first bus transfer operation, the central memory including a parity logic and responsive to the new data for generating corresponding parity information and storing the new data and the corresponding parity information, the central memory being responsive to data read requests for providing corresponding data and parity information from the central memory when the corresponding data and parity information is stored in the central memory.

6. The redundant media device mass storage system of claim 5, further comprising:

in the host adapter,
a storage system processor executing a storage system operating system for controlling operations of the redundant media device mass storage system,
the storage system operating system including demand paging functions, and
each central memory being responsive to the storage system operating system for reading pages of stored data or parity information from the corresponding media device and storing the pages of data or parity information in the central in anticipation of read and write operations.

7. The redundant media device mass storage system of claim 5, further comprising:
in the host adapter,
a storage system processor executing a storage system operating system for controlling operations of the redundant media device mass storage system,
the storage system operating system including prefetch functions, and
the central memory being responsive to the storage system operating system for prefetching stored data or parity information from the corresponding media device in anticipation of read and write operations.

8. In a redundant media device mass storage system for use with a host computer for storing data and related parity information, a method for writing data to the mass storage system, comprising the steps of:
connecting a host adapter from the host computer for controlling operations of the redundant media device mass storage system,
providing a plurality of media devices for storing data and parity information,
providing a plurality of media adapters, each media adapter corresponding to and connected to a media device and including party logic, and
providing a data bus and a control bus connected between the host adapter and the plurality of media adapters, the media adapters being connected in parallel from the data bus and the control bus, and
in a first bus transfer operation, by operation of a host adapter connected between the host computer and a data bus and a control bus for controlling operations of the redundant media device mass storage system host and in response to a new data write request from the host computer, providing
a corresponding identification of a data media device storing old data corresponding to the new data and a parity media device storing parity information relating to the old data on the data bus, the data media device and the parity media device being members of a plurality of media devices and each of the media devices being connected in parallel to the data bus and the control bus through corresponding media adapters, each media adapter including parity logic, and
the new data on the data bus,
the new data being broadcast on the data bus to each of the plurality of media adapters in parallel, and
in the data and parity media adapters corresponding to the data and media devices and in response to the identifications of the media devices,
reading the old data and the corresponding parity information from the corresponding data and parity media devices and in the data media adapter, receiving the new data from the data bus, and in a second bus transfer operation,
broadcasting the old data from the data media adapter on the data bus to each of the plurality of media adapters in parallel and writing the new data to the corresponding data media device, and
in the parity media adapter, receiving the old data from the data bus and by operation of the parity logic thereof generating new parity information from the old data, the new data and the old parity information, and writing the new parity information to the corresponding parity media device.

9. The method for writing data to the mass storage of claim 8, further comprising the steps of:
in each media adapter,
in a demand page memory connected between the corresponding media device and the data bus
storing data or parity information read from the corresponding media device and received from the data bus, and
storing copies of a part of the data or parity information stored on the corresponding media device and responsive to data read and write requests from a disk platform for providing the copy of the corresponding stored data or parity information stored in the demand page memory.

10. The method for writing data to the mass storage system of claim 9, further comprising the steps of:
in the host adapter and by operation of a storage system processor,
executing a storage system operating system for controlling operations of the redundant media device mass storage system,
the storage system operating system including demand paging functions, and
in each media adapter and in response to the storage system operating system, reading pages of stored data or parity information from the corresponding media device and storing the pages of data or parity information in the demand page memory in anticipation of read and write operations.

11. The redundant media device mass storage system of claim 9, further comprising the steps of:
in the host adapter and by operation of a storage system processor,
executing a storage system operating system for controlling operations of the redundant media device mass storage system,
the storage system operating system including prefetch functions, and
in each media adapter and in response to the storage system operating system
prefetching stored data or parity information from the corresponding media device in anticipation of read and write operations.

12. The method for writing data to the mass storage system of claim 8, further comprising the steps of:
in a central memory connected from the data bus in parallel with the plurality of media adapters
receiving new data broadcast on the data bus in the first bus transfer operation,
by operation of a parity logic and responsive to the new data, generating corresponding parity information and storing the new data and the corresponding parity information, and in response to data read requests, providing corresponding data and parity information from the central memory when the corresponding data and parity information is stored in the central memory.

13. The method for writing data to the mass storage system of claim 12, further comprising the steps of:

in the host adapter,
  executing the storage system operating system for controlling operations of the redundant media device mass storage system,
    the storage system operating system including demand paging functions, and
  in the central memory and in response to the storage system operating system, reading pages of stored data or parity information from the corresponding media device and storing the pages of data or parity information in the central in anticipation of read and write operations.

14. The method for writing data to the mass storage system of claim 12, further comprising the steps of: p1 in the host adapter,
  executing the storage system operating system for controlling operations of the redundant media device mass storage system,
    the storage system operating system including prefetch functions, and
  in the central memory and in response to the storage system operating system, prefetching stored data or parity information from the corresponding media device in anticipation of read and write operations.

* * * * *